Patented Jan. 26, 1943

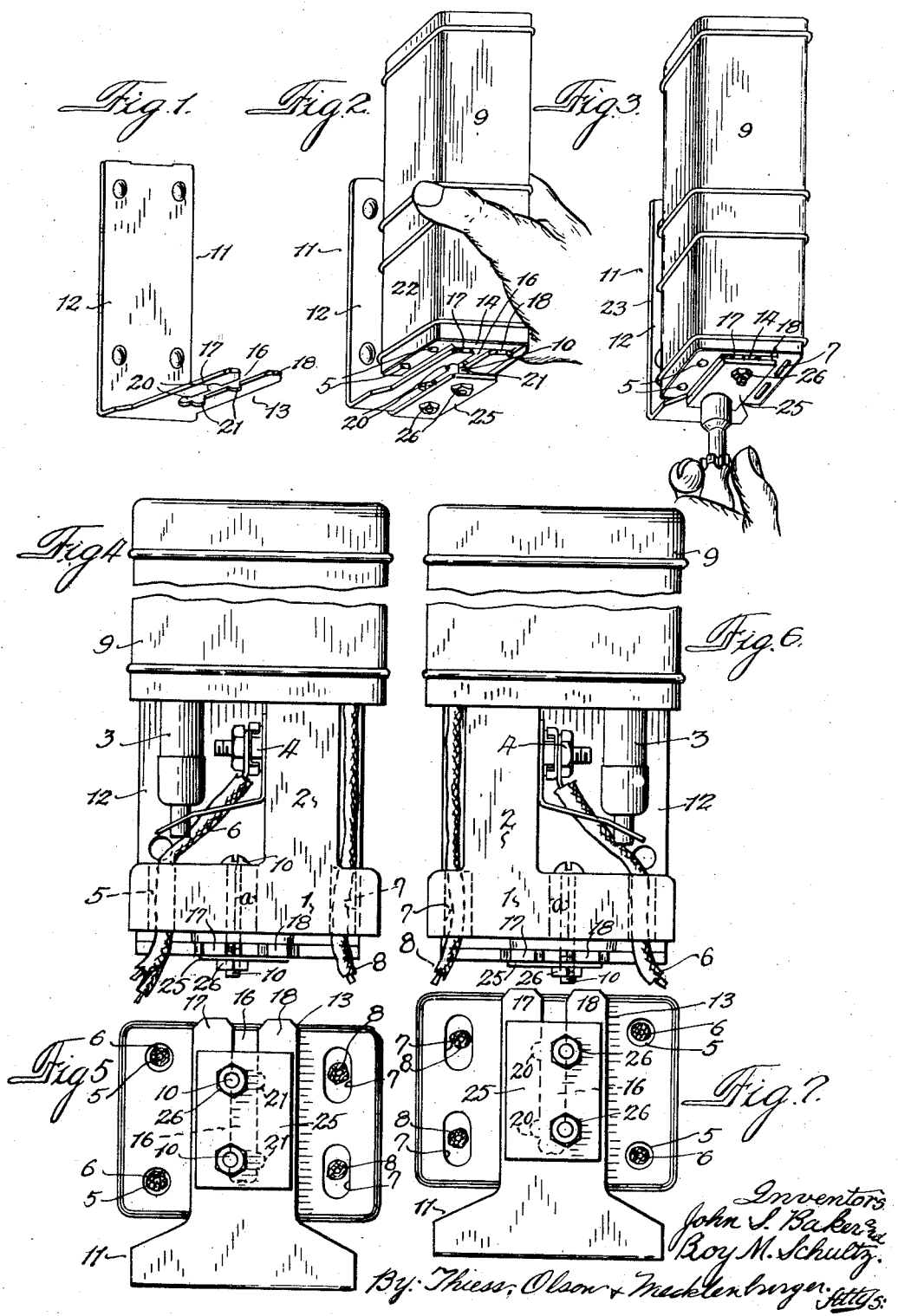

2,309,232

UNITED STATES PATENT OFFICE 2,309,232

MOUNTING BRACKET FOR SUBSTATION PROTECTORS

John S. Baker and Roy M. Schultz, Chicago, Ill., assignors to Cook Electric Company, Chicago, Ill., a corporation of Illinois Application August 3, 1940, Serial No. 350,444

4 Claims. (Cl. 174—52)

This invention relates to mounting brackets for sub-station protectors used particularly for telephone, telegraph, or like systems.

It is well known that in different installations the line wires and subscriber's lines do not approach the sub-station protectors on the same sides. This requires the wires to be crossed in order to complete the necessary connections at the sub-station protectors. Crossing wires is an undesirable practice, especially if connections are exposed to outside elements. Breaking down of insulation as the result of wires rubbing with each other will occur. Sub-station protectors are usually mounted close to the customer's service, and, if an outside location is afforded, they are generally mounted upon the side of the building near the entrance of the wires into the building. The locations are sometimes conspicuous but not conveniently accessible to the linemen. As the result, the sub-station protectors are mounted in an unsightly manner and with the wires crossing each other, thereby causing considerable trouble at times by worn insulation that is sometimes not easily detectable and causes leaks that are very disturbing to the service over the lines.

An object of the invention is to provide an improvement in a mounting bracket and in the design of a sub-station protector whereby the aforesaid difficulties are overcome, both being so arranged that the protector may be accurately positioned centrally and perpendicularly upon the bracket and the connections so made at the protector as to avoid crossing of the wires notwithstanding the fact that some installations may require the line wires and subscriber's wires to approach the protector on sides different from other installations.

A further object of the invention is to provide a novel form of mounting bracket having a base adapted to cooperate with a base of a sub-station protector whereby the protector can be reversibly positioned substantially centrally upon the mounting bracket without loss of perpendicular alignment. Sub-station protectors are usually provided with fuses, lightning arresters, grounding contacts, etc., carried upon porcelain mountings in compact arrangement. A vertical wall forming a part of the porcelain mounting extends along one side in off-centered relation, thereby requiring the securing means extending from the base of the sub-station protector to be off-centered. The invention novelly provides means on the base of the mounting bracket to compensate for such off-centering of said securing means so that the sub-station protector will always be substantially centrally positioned upon the bracket and vertically aligned therewith.

A further object of the invention is to provide a novel form of mounting bracket for sub-station protectors that eliminates danger of damaging the porcelain parts of the protectors while mounting the same upon the brackets, that admits of easier and more rapid installation, that prevents dropping of parts during the installation, that saves time and is more convenient to handle, as well as easy to adjust in a desired position.

Other objects and advantages will be apparent from the following description when taken in connection with the accompanying drawing, which forms a part hereof.

In the drawing:

Figure 1 is a perspective view of a bracket forming part of the present invention;

Fig. 2 is a similar view of the bracket and a sub-station protector to illustrate the manner of mounting the latter upon the bracket in accordance with the present invention;

Fig. 3 is also a similar view illustrating the manner of securing the sub-station protector in position upon the bracket;

Fig. 4 is a front elevation of a sub-station protector mounted upon the bracket, the cover of the protector being slightly raised and broken away, this view illustrating one of the positions of the protector upon the bracket;

Fig. 5 is a bottom plan view of the device shown in Fig. 4;

Fig. 6 is a view similar to Fig. 4 but illustrating the protector in its other position upon the bracket; and Fig. 7 is a bottom plan view of the device shown in Fig. 6.

A sub-station protector to which the invention refers may be of the type including a horizontal base 1 and a vertical wall 2, which may be integrally formed with the base and made of any suitable insulation material such as porcelain. Protective devices including suitable fuses 3, lightning arresters (not shown) and terminals 4 may be disposed upon vertical wall 2. Base 1 is provided with holes 5 along one side for receiving line wires 6 and with openings 7 along the other side for receiving wires 8 leading to the subscribers' lines. A suitable cover or enclosure 9 is slidably positioned over the structure to enclose the same, the lower edge of this hood 9 extending about the lower edge of base 1, as illustrated in Figs. 2 and 3. A more complete description of the construction of this sub-station protector will be found in United States Letters Patent No. 1,800,978, granted April 19, 1931 to coapplicant John S. Baker. It is deemed unnecessary, therefore, to give a further description of the sub-station protector and we wish it to be understood that the invention is not to be limited to any specific form of protector, it being remembered that generally protectors of the type referred to employ a porcelain base similar to that of base 1 and a wall similar to that of vertical wall 2 for supporting protective devices, such as fuses 3, terminals 4, etc. In view of the off-center relation of wall 2, mounting screws 10 extending through base 1 are likewise provided in off-centered relation.

A bracket 11 for mounting the sub-station protector includes a vertical wall leg 12 and a slotted base leg 13. The sub-station protector is adapted to be seated upon slotted base 13 in a manner to cause reenforcing shoulder 14 only on the underside of porcelain base 1 to be engaged. Shoulder 14 is limited in width so as to lie between openings 5 and 7, and not to interfere with the passage of line wire 6 and subscriber's lines 7 through these openings. Base leg 13 may be reduced to the width of shoulder 14.

Base leg 13 is provided with a central slot 16 which divides this base leg into two parts 17 and 18. Slot 16 is slightly larger in width than the diameter of fastening screws 10, which permits these fastening screws to move freely in and out of slot 16. Also, slot 16 is preferably of a width equal to the amount of off-centering of fastening screws 10, which is represented at $a$ in Figs. 4 and 6. The inside edges of parts 17 and 18 of base leg 13 are provided with pairs of semi-circular openings 20 and 21, each pair being adapted to receive fastening screws 10, depending upon the position of the protector. If fastening screws 10 lie in openings 20, as illustrated in Fig. 5, the line of center of these fastening screws lies along the inside edge of part 17. If fastening screws 10 lie in openings 21, as illustrated in Fig. 7, the line of center of these fastening screws lies along the inside edge of part 18. As stated, the width of slot 16 is equal to the extent of off-center of fastening screws 10, as illustrated at $a$ in Figs. 4 and 6.

When fastening screws 10 rest in openings 20, as illustrated in Figs. 4 and 5, line wires 6 connect to the protector at the left-hand side, while the subscriber's lines are led from the protector at the right-hand side. When fastening screws 10 lie in openings 21, line wires 6 approach and connect to the protector at the right-hand side, while the subscriber's lines lead from the protector at the left-hand side, as illustrated in Figs. 6 and 7.

It will be observed that the position of the sub-station protector upon base leg 13 of bracket 11 will depend upon the direction of approach of line wires and subscriber's wires. It will not be necessary to cross these wires and allow a rubbing contact between the same, which will, in time, break down the insulation and permit leakage that will disturb the service over the lines. As stated, if line wires 6 are on the left-hand side and the subscriber's lines are on the right-hand side, the sub-station protector may be positioned as shown in Fig. 4. On the other hand, if line wires 6 are on the right-hand side and subscriber's lines 8 are on the left-hand side, the sub-station protector may be positioned as shown in Figs. 6 and 7. Hence, the sub-station protector is reversible with respect to its position upon base leg 13 of bracket 11.

To facilitate fastening the sub-station protector upon bracket 11 and assure that it will assume a vertical position and be somewhat centrally located with respect to bracket 11, a rectangular plate 25 is carried upon fastening screws 10. As nuts 26 are threaded upwardly along fastening screws 10, say in the manner illustrated in Fig. 3, plate 25 will be brought to bear flatly against the underface of base leg 13, thereby centering and seating shoulder 14 flatly upon the upper face of this base leg 13. The lower ends of fastening screw 10 may be burred to prevent nuts 26 from being completely backed off fastening screws 10. Plate 25 will thereby be carried upon fastening screws 10, so that neither it nor the nuts 26 will drop free of these fastening screws. Consequently, these parts cannot be accidentally dropped by the workmen in the mounting of the sub-station protector upon bracket 11, nor lost in transit or mislaid when the sub-station protector is temporarily removed from bracket 11. Moreover, the arrangement of fastening screws 10 and shoulder 14 upon the underside of porcelain base 1 and the necessary central positioning of this shoulder 14 upon base leg 13 when plate 25 is fastened against the underside of this base leg eliminates any strain upon porcelain base 1 that is apt to crack or break it. Hence, there is no danger of damaging the porcelain during the mounting operation.

It will be further observed that bracket 11 may be vertically positioned against the wall adapted to receive the same so that the sub-station protector will likewise always be vertically positioned with respect to said wall and said bracket 11. It will be impossible to carelessly mount the sub-station protector upon bracket 11 after this bracket has once been properly mounted upon the wall. Also, the structure provided for mounting the sub-station protector upon bracket 11 assures that the former will always be somewhat centrally positioned with respect to the latter, irrespective of the position in which the protector is mounted.

The structure disclosed provides a very efficient and simple form of mounting for sub-station protectors and assures against carelessness of workmen in not properly positioning the protector or in not preventing the crossing of wires.

Without further elaboration, the foregoing will so fully explain the gist of our invention that others may, by applying current knowledge, readily adapt the same for use under varying conditions of service, without eliminating certain features, which may properly be said to constitute the essential items of novelty involved, which items are intended to be defined and secured to us by the following claims.

We claim:

1. In combination with a terminal box having a base and a plurality of off-centered fastening members projecting downwardly through said base, a mounting including a bracket member, said bracket member comprising a wall leg and a slotted base leg extending outwardly from said wall leg, the width of the slot of said base leg being substantially equal to the extent of off-centering of said fastening members, said base leg having openings formed therein along each side of said slot, each side of said slot forming the center line of the openings therein, and means for locking said fastening members in the openings on either side of said slot.

2. In combination with a terminal box having a base and a plurality of off-centered fastening members projecting downwardly through said base, a mounting including a bracket member having a wall leg and a base leg, and means for centrally and vertically positioning said terminal box with respect to said bracket member and locking said fastening members to said base leg, said means comprising a longitudinal slot in said base leg and aligned openings in said base leg along each side of said slot for receiving said fastening members.

3. In combination with a terminal box to be reversibly carried to place the line wires and customer's wires on either of opposite sides thereof without crossing the same, a mounting comprising a bracket having a wall leg and a slotted base leg, said base leg having two sets of openings therein communicating with the slot in said base leg, each set of openings having the center line thereof along one edge of said slot, and fastening members extending downwardly from said terminal box adapted to seat in either set of said openings.

4. In combination with a terminal box to be reversibly carried to place the line wires and customer's wires on opposite sides thereof without crossing the same, said terminal base having a base provided with a substantially flat face and a plurality of fastening members projecting downwardly therethrough, a mounting comprising a bracket having a wall leg and a base leg extending at right angles from said wall leg, said base leg being centrally slotted and having two sets of openings therein, each set of openings communicating with said slot and having the center line thereof substantially along one edge of said slot, and means for holding said fastening members in one of said sets of openings, said means comprising a substantially flat plate-like member through which said fastening members extend, said plate-like member being clamped against the underface of said base leg of said bracket to hold said terminal box base against the upper face of said base leg.

JOHN S. BAKER.
ROY M. SCHULTZ.